SEMI-ASYNCHRONOUS CLOCK SYSTEM

Filed Nov. 14, 1961

INVENTORS
GERARD T. PAUL
STANLEY H. PITKOWSKY

BY Delbert C. Thomas

ATTORNEY

United States Patent Office 3,248,707

Patented Apr. 26, 1966

3,248,707

SEMI-ASYNCHRONOUS CLOCK SYSTEM

Gerard T. Paul, Poughkeepsie, N.Y., and Stanley H. Pitkowsky, Philadelphia, Pa., assignors to International Business Machines Corporation, New York, N.Y., a corporation of New York Filed Nov. 14, 1961, Ser. No. 152,321
4 Claims. (Cl. 340—172.5)

This invention relates to clock systems for data processing machines and more particularly to a clock system having provisions to block one or more clock pulses whereby operation of a controlled machine portion may be temporarily arrested.

Originally data processing machines processed data by a serial arrangement of program steps, each step being completed prior to initiation of the next step. This type of operation is slow and usually most major sections of the machine are idle in any one step. To improve machine utilization and to speed up processing, recent machines have operated on a pipeline system wherein each major section is largely independent and has input and output buffer storages where needed to enable concurrent operation of all sections having input data available.

The present invention provides additional utilization and increased operational speed in the central processing unit of such a processor by enabling a second operation to start within the unit prior to the completion of a first operation. Such a second operation is permitted to proceed up to the point where a change would be effected in the state of components storing the results of the first operation and is halted at that point. As soon as the results of the first operation have been checked and utilized, the results stored within the central processing unit are of no further value and the second operation may now continue and utilize the previously reserved components. Thus a large part of the time required for a second operation may be overlapped with that of a first operation resulting in increased processing speed. Such overlapping operations will proceed stepwise through the processing unit under control of clock pulses but such clock pulses must be interruptable to halt the second operation until the results of the first are utilized and the answer storage units are free for use in the second operation. Such interruption of clock pulses must be restricted to the central processing unit only since a halt in other units could prevent utilization of the results of the first operation.

It is then an object of this invention to provide a clock pulse distribution system wherein transmission of pulses to one section may be interrupted without effect on the remainder of the system.

It is also an object to provide a clock pulse distribution system having a portion thereof automatically controlled to interrupt transmission during such time as continued operation would result in errors or destruction of data.

Still another object is the provision of a clock pulse system which may be interruptable for an integral number of pulses whereby internal operation of a unit will be synchronous with other units but the over-all operation will be asynchronous and each operation will receive the number of clock pulses needed to complete the operation.

A still further object is the provision of a clock system in which an operation controlled by clock pulses is permitted to proceed to a point, automatically interrupted if interruption is needed to prevent loss of data and thereafter automatically reinitiated as soon as permissible whereby data may be processed asynchronously.

The foregoing and other objects, features and advantages of the invention will be apparent from the following more particular description of the preferred embodiment of the invention, as illustrated in the accompanying drawings.

GENERAL DESCRIPTION

Figure 1:
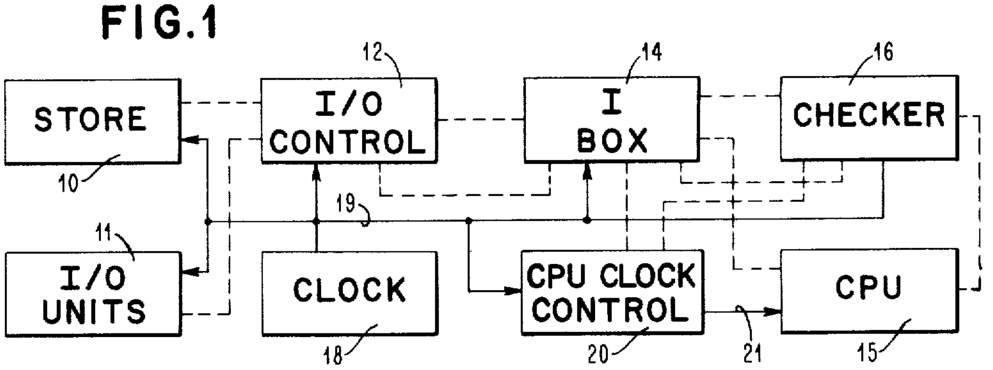
FIGURE 1 is a schematic diagram of a data processing system in which the invention may be used.

The schematic diagram of FIGURE 1 is representative of the type of data processing system in which the structure of the invention may be used. One embodiment of a system of this type is the commercially produced IBM 7030 System, commonly known as the STRETCH System. The first installation of a STRETCH system was in the Los Alamos Scientific Laboratory of the Atomic Energy Commission in April 1961, and a number of other STRETCH installations were made at later dates. The overall design of STRETCH was summarized in a paper presented at the Eastern Joint Computer Conference, Boston, Massachusetts, on December 1, 1959, by Erich Block and titled, "The Engineering Design of the STRETCH Computer." In this type of system, there is a data store or memory 10 capable of receiving or supplying information comparatively rapidly. A plurality of input/output units, collectively identified as 11, such as printers, card punch readers, magnetic tape units and the like, supply or receive raw data or results. An input/output control unit 12 is provided to direct information selection and transmission between these information handling units 10 and 11 and the information processing units. For processing information, the system will include an instruction unit, I BOX 14, to utilize certain information words as operating instructions for the processing operations and to direct transmission of other words as information for processing. The central processing unit (CPU) 15 does the required processing on the information words as directed by I BOX 14. A checking unit 16 is provided to determine that the information processing by CPU 15 has been correctly performed. Such checking is generally performed by duplicating the operation performed by CPU 15 but using parity and residue symbols accompanying the information and comparing the generated symbols with corresponding ones derived from the results of the processing in CPU 15. Some of the major information paths are shown in FIGURE 1 in dotted lines with data paths entering and leaving the sides of the boxes and control channels entering the boxes vertically.

Also shown in FIGURE 1 is a system clock 18 connected by a distribution system 19 to all of the above units 10, 11, 12, 14 and 16 but not to CPU 15. The pulses of the clock system are used to time and thus synchronize the transmission of information between the various units and to control progress of information through the stages of a unit. The processor 15 receives its clock pulses through a clock control unit 20 so that its internal operation is synchronous with that of the other units. The train of clock pulses to CPU 15 is, however, interruptable by control 20 to halt the progress of data through CPU 15 and thus the over-all operation of the processing unit 15 is semi-asynchronous with respect to the operations of the other units since its result signals may become available on any one of the clock pulses. In larger data processing systems, such delays do not cause a system halt since the various units are largely autonomous and will proceed on other work until the processed information is available. In general, the operations of CPU 15 will be suspended for only a few clock pulses and the CPU speed is sufficiently greater than that of the input/output units 11 and store 10 that the over-all system operation is not slowed.

CLOCK CONTROL

Figure 2:
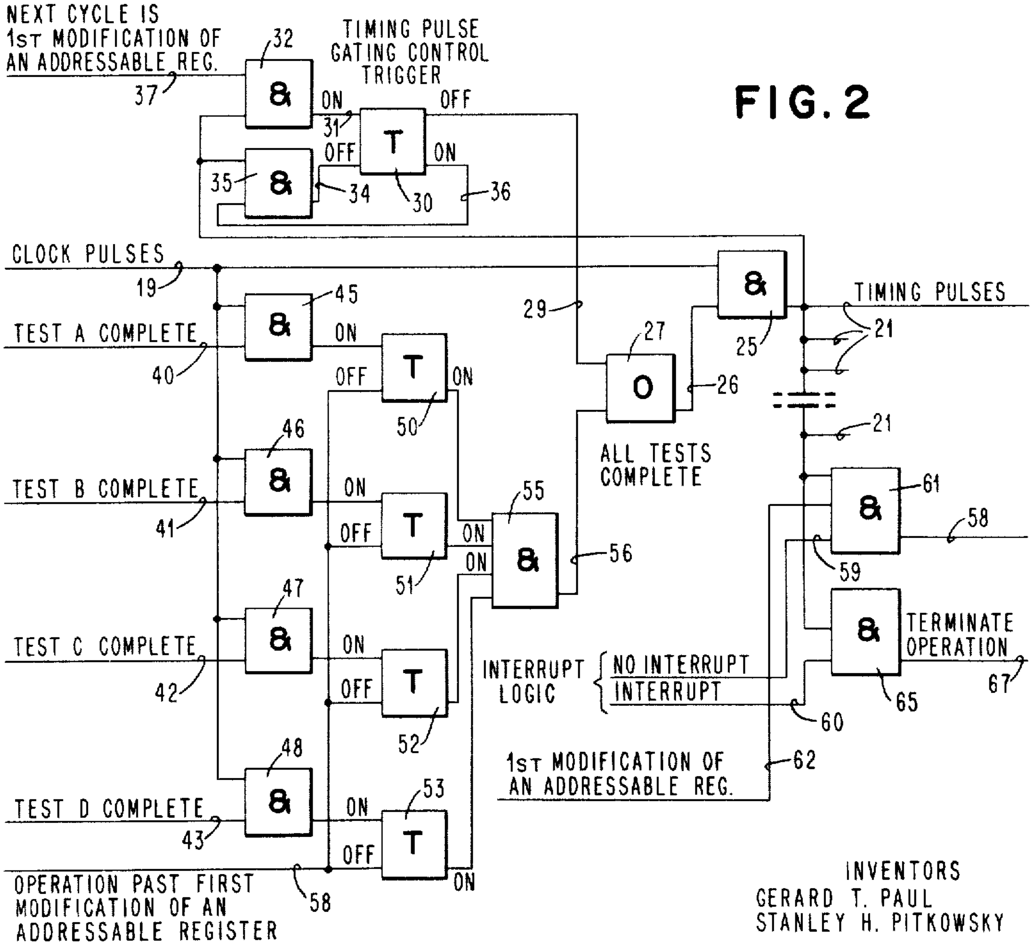
FIGURE 2 is a block diagram of the preferred embodiment of the invention.

The CPU clock control 20 is shown in greater detail in FIGURE 2. As described above, a second processing operation may start in the CPU 15 before the results of a first operation have been utilized and therefore the second operation should be arrested when it would prematurely alter the results of the first operation. The final result of a processing operation is retained in a storage register and as data may be directly fed into or extracted from this register, it has an address through which it may be selected under program control. In each functional sequence of elemental operations in the processing unit 15, there is a definite cycle in which the storage register is needed to store the new data being generated. The processor 15 is therefore set up to generate a signal during the cycle preceding the definite one in which new data will be stored in the addressable register. Such a signal may be derived from the stored program if the system uses a program instruction for each cycle or from the wired-in cycle controls in systems wherein only a single instruction is required to enable an automatic sequence of cycles. This signal will then occur in the last cycle which may be permitted in a second sequence until the results of the first sequence have been utilized and need not be retained.

Referring now to FIGURE 2, the clock pulses on line 19 are applied to one input of a conventional AND circuit 25, i.e., a circuit in which both inputs must be at a signal level before the output line 21 will go to a signal level. The other input 26 to AND 25 is normally at a signal level and the clock pulse signal on line 19 will be passed to output line 21 for distribution within the CPU 15. Line 26 is the output of an OR circuit 27, i.e., a circuit in which the output line will carry the signals applied to any one or more of the input leads, and will normally be held at the signal level by an OFF signal on input 29 from a bistable trigger or flip-flop 30. Trigger 30 has an ON input line 31 which is the output of an AND 32 and an OFF input line 34 which is the output of an AND 35. Trigger 30, as is conventional, will change states at the termination of a signal applied to the input 31 or 34 not corresponding to the present state of the trigger so that termination of a signal on ON line 31 will turn trigger 30 on and put a signal on the ON output line 36 and similarly a signal on OFF input 34 will switch the trigger 30 from on to off to put a signal on OFF output 29. Each AND 32 and 35 receives the clock pulse signal on line 21 as one of its inputs and AND 32 also receives on its other input 37 the above-described signal indicating that the first modification of an addressable register will occur on the next cycle. AND 35 has its other input connected to the ON output line 36 of trigger 30.

In operation, trigger 30 will normally be OFF, putting a signal on line 29 which through OR 27 keeps the lower input to AND 25 at a signal level. The clock pulse signals on line 19 will now pass through AND 25 and be distributed through the CPU system on line 21. The clock pulses on line 21 will also be inputs to ANDs 32 and 35 but will not pass since the other inputs are not at a signal level. When the processing unit puts a signal on line 37, AND 32 will pass the next clock pulse from line 21 and the trailing edge of this pulse will turn trigger 30 to the ON state. This removes the signal from line 29 and blocks AND 25 so that no more clock pulses pass to line 21. When the next clock pulse on line 19 is passed to line 21 by means to be set out below, the ON line 36 is at a signal level and the clock pulse will pass through AND 35 to turn trigger 30 back to OFF at the termination of the pulse. Thus the next clock pulse passing through AND 25 will re-establish conditions to continue passage of pulses through AND 25.

Since as set out above, a checker 16 of FIGURE 1 must determine the correctness of the result of a processing operation before the results are free for use in later processing, and the result is not available until the processing is completed, there may be a delay of one or a few cycles before the result is certified as correct. During these cycles, the second operation may be using the first result for processing but only to the point where unrecoverable changes might occur. At this point, the second operation is arrested until the checker 16 has had time to complete its tests. In FIGURE 2, four lines 40 to 43 are shown as coming from checker 16 and each line will receive a signal when the time for a corresponding result testing operation has elapsed. It is to be understood that some of the operations do not require that all of the tests be made and for those omitted tests, the corresponding lines 40–43 will be retained at the signal level. Each line 40 to 43 is connected to one input of an AND circuit 45 to 48 and clock pulse line 19 is connected to the other input of each AND 45 to 48. The output of each AND 45 to 48 is connected to the ON terminal of a normally OFF trigger 50 to 53 to set its corresponding trigger when the time period for a test is complete. Each trigger 50 to 53 has its ON output line connected as an input to an AND circuit 55 so that the output line 56 of AND 55 will receive a signal only when sufficient time has passed for all of the tests to be performed by checker 16. Output line 56 is an input to OR 27 and when at a signal level will also enable AND 25 to pass clock pulse signals to line 21 and permit CPU 15 to continue processing. As above noted, the first pulse on line 21 will reset trigger 30 to continue the pulses on line 21.

Triggers 50 to 53 are reset to their OFF status by a signal on line 58 which is connected to the OFF terminals of each trigger 50 to 53. The signal on line 58 indicates an operation after the first modification of an addressable register and may be derived as set out below.

There are other reasons beside the accuracy of the result for terminating a particular series of operations in the CPU 15. For example, a result may call for a branch from the normal operations and under such terminating conditions, the second operation then in CPU 15 is not the proper second operation and recovery operations must be instituted. The recovery operation will be instituted by the I BOX 14 in the event of a branch or as a result of a signal from checker 16 if an error is to be corrected, and among other things will result in dropping a signal normally present on a no-interrupt line 59 and putting a signal on an interrupt line 60. So long as no interrupt is required, AND circuit 61 has a signal applied to its lower input by line 59 and receives the timing pulses on line 21 on its upper input. In the cycle in which the first modification of an addressable register occurs, a signal is present on line 62, the middle input of AND 61, and the pulse on line 21 is passed to line 58 to reset the triggers 50 to 53.

If, however, an interrupt is called for, line 60 will have a signal thereon. An AND 65 receives clock pulses from line 21 on its upper input and the signal on line 60 on its lower input. If then, an interrupt signal appears on line 60 during the time required for performing the required tests, this signal will be passed to output line 67 by the first pulse on line 21 after the time for testing has passed and will initiate termination operations rather than continued data processing operations.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A clock circuit control to connect a system clock circuit to the central processing unit of a data processing system having:

a central processing unit to convert input data, to temporarily retain the results of conversion, and to partially convert a second set of data while the said results are retained, a checking unit to determine prior to utilization of said result, that said result is compatible with the input data for said result and a system clock circuit to control said processing system; said clock circuit control comprising:

a first bistable device to normally enable said clock circuit to control said central processing unit, a signal circuit controlled by said central processing unit to enable said clock circuit to change the state of said first bistable device to thereby block clock circuit control of said unit whereby a data processing operation may be halted, a plurality of second bistable devices, each settable when said checking unit has had sufficient time to complete a corresponding test on said result and an enabling circuit controlled by said plurality of second bistable devices to re-enable said clock circuit control over said central processing unit.

2. A clock control as claimed in claim 1 including:

means activated by said re-enabled clock circuit to return said first bistable device to its first state and a reset circuit under control of said central processing unit and said re-enabled clock circuit to reset all of said plurality of second bistable devices.

3. A clock control as claimed in claim including:

a circuit to initiate a terminating operation, said circuit including an activating connection enabled by said checking unit when data processing is to be interrupted to connect said re-enabled clock circuit to said operation terminating circuit.

4. A clock circuit control unit to connect a system clock circuit to a central processing unit of a data processing system of the type having:

a central processing unit to convert input data, to temporarily retain the results of a conversion and to partially convert a second set of data while said results are retained, a checking unit to determine prior to utilization of said result, that said result is compatible with the input data for said result and a system clock circuit to control said processing system; said control unit comprising:

a clock distributing circuit for said central unit, a gate to connect said clock circuit to said distributing circuit, a bistable device normally set to enable said gate, means controlled by said central unit and said distributing circuit to set said bistable device to a gate disabling condition, a plurality of second bistable devices, each settable by said checking unit prior to utilization of said converted results for indicating that a corresponding test is completed, a second gate controlling circuit normally inactive and rendered active when all of said plurality of second bistable devices are set to enable said gate and means activated by said clock distributing circuit when said second gate controlling circuit is active, to reset all said bistable devices to their normal state.

References Cited by the Examiner

UNITED STATES PATENTS

| | | | |
|---|---|---|---|
| 2,978,678 | 4/1961 | Winger et al. ------ | 340—172.5 |
| 3,045,217 | 7/1962 | Housman et al. ---- | 340—172.5 |

ROBERT C. BAILEY, *Primary Examiner.*

MALCOLM A. MORRISON, *Examiner.*

E. M. RONEY, P. L. BERGER, *Assistant Examiners.*